(12) United States Patent
Coste et al.

(10) Patent No.: US 8,588,030 B2
(45) Date of Patent: Nov. 19, 2013

(54) REDUCING NOISE IN SEISMIC SURVEYING ENVIRONMENT

(75) Inventors: Emmanuel Coste, Oslo (NO); Timothy James Dean, Redhill (GB); Colin Readman, Dubai (AE)

(73) Assignee: WesternGeco L.L.C., Houston, TX (US)

( * ) Notice: Subject to any disclaimer, the term of this patent is extended or adjusted under 35 U.S.C. 154(b) by 495 days.

(21) Appl. No.: 12/774,304

(22) Filed: May 5, 2010

(65) Prior Publication Data

US 2011/0273966 A1 Nov. 10, 2011

(51) Int. Cl.
*G01V 1/04* (2006.01)

(52) U.S. Cl.
USPC .......................................... 367/190

(58) Field of Classification Search
USPC ........................... 367/38, 189, 190
See application file for complete search history.

(56) References Cited

U.S. PATENT DOCUMENTS

| | | | |
|---|---|---|---|
| 4,147,228 A * | 4/1979 | Bouyoucos | 181/119 |
| 4,519,053 A * | 5/1985 | Bedenbender | 367/190 |
| 4,723,231 A * | 2/1988 | Sallas | 367/189 |
| 4,922,473 A | 5/1990 | Sallas et al. | |
| 4,930,113 A | 5/1990 | Sallas | |
| 5,555,530 A * | 9/1996 | Meehan | 367/45 |
| 6,381,544 B1 | 4/2002 | Sallas et al. | |
| 6,665,619 B2 | 12/2003 | Bird et al. | |
| 2005/0024990 A1* | 2/2005 | Laake | 367/38 |
| 2010/0014383 A1 | 1/2010 | Laake | |
| 2010/0232260 A1* | 9/2010 | Zowarka et al. | 367/189 |

OTHER PUBLICATIONS

Sallas et al., "Air-Coupled Noise Produced by a Seismic P-Wave Vibrator," SEG, 1989: pp. 686-689.

* cited by examiner

*Primary Examiner* — Mark Hellner (57) ABSTRACT

In one embodiment of the invention a method includes (a) operating a combustion engine at a first activity level corresponding to a first noise level; (b) charging an accumulator with a first pressure input; (c) lowering engine activity level of the engine to a second activity level corresponding to a second noise level that is lower than the first noise level; and (d) seismic sweeping with the vibrator based on the first pressure input and lowering engine noise from the first noise level to the second noise level.

24 Claims, 7 Drawing Sheets

REDUCING NOISE IN SEISMIC SURVEYING ENVIRONMENT

BACKGROUND

Geophysical surveys may estimate the depth, shape, and composition of subterranean formations using seismic vibrators in a Vibroseis method where seismic waves (e.g., P waves, S waves, and the like) are induced by a vibrator and then detected using one or more geophones.

A vibrator may be mounted on a truck or embodied as a large vehicle having a hydraulically powered "shaker" or actuator. The actuator may transmit vibrational energy to the earth via a baseplate coupled to the ground. More specifically, the actuator may force a mass onto the baseplate to create vibrations according to a controlled sweep of frequencies. Using "upsweep" methods, the vibrations may start at a lower frequency and end at a higher frequency. In a "downsweep" method the vibrations may start at a higher frequency and end at a lower frequency. Geophones, placed in a "spread" on or in the earth's surface, may detect seismic wave-induced vibration reflections from rock strata. Rock layers may reflect the seismic waves according to contrasting acoustic impedances between the layers. For example, an interface with a low impedance layer above a high impedance layer may reflect a large proportion of the incident wave. This reflected wave may be of greater amplitude than may be the case with an interface having layers of similar impedance. Measuring the intensity and time delay of an arriving reflected wave, at numerous locations in the spread, may allow mapping of rock strata and may provide information about the thickness and composition of earth layers.

The vibrator may be located within the geophone spread and may, however, produce source generated noise that masks wave reflections recorded by the geophones.

Source generated noise may include, for example, air wave noise. Specifically, since the vibrator is exposed to air, some of the vibrator's vibrational energy (e.g., from an upper surface of the baseplate) may be transmitted through the air as sound waves. The noise may be strongest at higher frequencies (e.g., 30 Hz and above). The air wave noise may include coherent noise, which may have a consistent phase from trace to trace. Air waves may be coupled to air and, in the case of low frequency waves (e.g., 6-8 Hz), partially coupled to near surface waves. A surface wave may include a wave (e.g., Love and Rayleigh waves) that propagates at the interface between two media (e.g., earth surface and air) and may result in, for example, ground roll. Ground roll is a type of coherent noise with low-velocity, low-frequency, and high-amplitude characteristics.

Source generated noise may also come from, for example, the vibrator's engine and movement of other mechanical components coupled to the vibrator. The vibrator's engine may provide power to move the vibrator from one shot site to another and may also supply power to hydraulic pumps. The pumps may generate pressure for hydraulic accumulators that store power used to operate the actuator (e.g., raise/lower the actuator to/from the ground and perform sweeps with the actuator). Also, harmonics caused by, for example, the non-linearity of the vibrator's servo-valve and base plate flexure can result in unwanted noise. Additional noise can be generated by other vibrators sweeping in the vicinity (e.g., during Simultaneous Source Acquisition) or from vehicular traffic such as another vibrator moving to another shot point.

Methods have been suggested to counter various types of noise (e.g., air wave noise) by making modifications to the vibrator itself or using active cancellation. However, certain types of noise (e.g., noise from vibrator engine, vibrator cooling system, near-by vibrators, nearby vehicular traffic) have been difficult to address.

SUMMARY

In one embodiment of the invention a method includes (a) operating a combustion engine at a first activity level corresponding to a first noise level; (b) charging an accumulator with a first pressure input; (c) lowering engine activity level of the engine to a second activity level corresponding to a second noise level that is lower than the first noise level; and (d) seismic sweeping with the vibrator based on the first pressure input and lowering engine noise from the first noise level to the second noise level.

In an embodiment of the invention a method includes (a) operating a combustion engine while the engine has a first activity level corresponding to a first noise level; (b) sensing a first environmental noise with a first sensor; and (c) initiating seismic sweeping with the vibrator based on determining the first environmental noise is less than a first predetermined threshold.

Other features will become apparent from the following description, drawings, and claims.

BRIEF DESCRIPTION OF THE DRAWINGS

Some embodiments of the invention are described with respect to the following figures.

DETAILED DESCRIPTION

In the following description, numerous specific details are set forth. However, it is understood that embodiments of the invention may be practiced without these specific details. Well-known circuits, structures, and techniques have not been shown in detail to avoid obscuring an understanding of this description. References to "one embodiment", "an embodiment", "example embodiment", "various embodiments" and the like indicate the embodiment(s) so described may include particular features, structures, or characteristics, but not every embodiment necessarily includes the particular features, structures, or characteristics. Further, some embodiments may have some, all, or none of the features (utilized in the same or differing orientations and orders) described for other embodiments. Also, as used herein "first", "second", "third" and the like describe a common object and indicate that different instances of like objects are being referred to. Such adjectives are not intended to imply the objects so described must be in a given sequence, either temporally, spatially, in ranking, or in any other manner.

Figure 1:
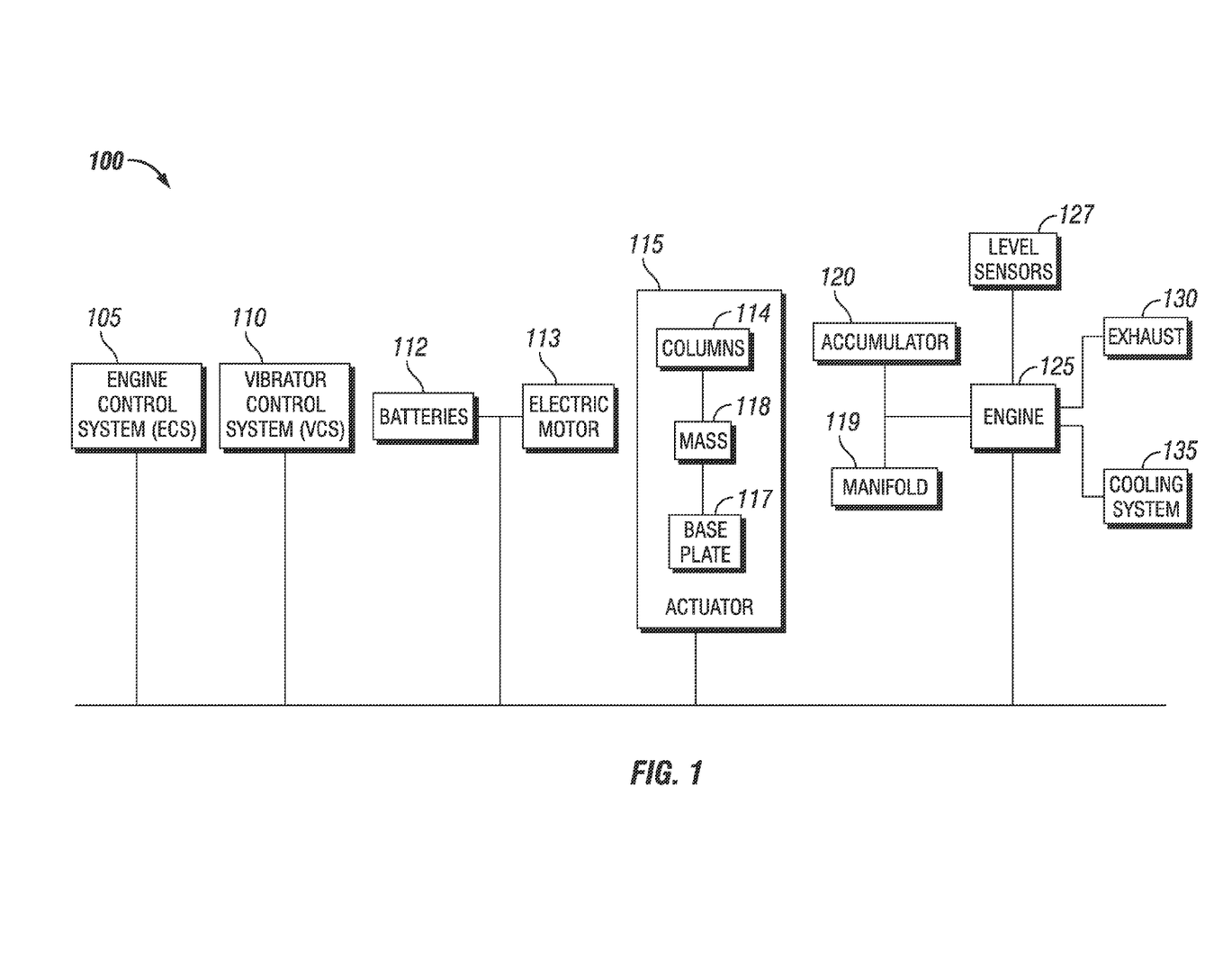
FIG. 1 includes a block diagram representative of a seismic vibrator in one embodiment of the invention.

FIG. 1 includes a block diagram representative of a seismic vibrator vehicle 100 in one embodiment of the invention. Vehicle 100 may include multiple power sources such as, for example, engine module 125 (e.g., gas or diesel powered combustion engine) and electric motor module 113, which may be coupled to one or more batteries 112. Vehicle 100 may include vibrator control system (VCS) module 110 coupled to engine control system (ECS) module 105, both of which may be battery powered. Actuator 115, including base plate 117, may be lowered and raised to and from the ground via guide columns 114. Guide columns 114 may also be used to maintain downward pressure on actuator 115 and plate 117 to keep plate 117 held firmly against the earth. Actuator 115 manipulates mass 118 to impose vibrations to plate 117 during sweeps that induce, for example, P and/or S waves. Vehicle 100 may further include accumulator 120 (e.g., one or more ten gallon accumulators), herein referred to as accumulator, accumulator(s), or accumulators, which may convert a smaller continuous or non-continuous power source into a larger surge of energy to operate, for example, actuator 115. Accumulator 120 may be a hydraulic accumulator and may supply pressure in cooperation with pressure supplied to actuator 115 from engine 125 (which may be coupled to non-illustrated pumps) via manifold 119. Vehicle 100 may also include, for example, exhaust system 130 and cooling system 135. In an embodiment, activity level sensors 127 are coupled to, for example, vibrator 100 components such as engine 125, cooling system 135, and exhaust 130.

Figure 2A:
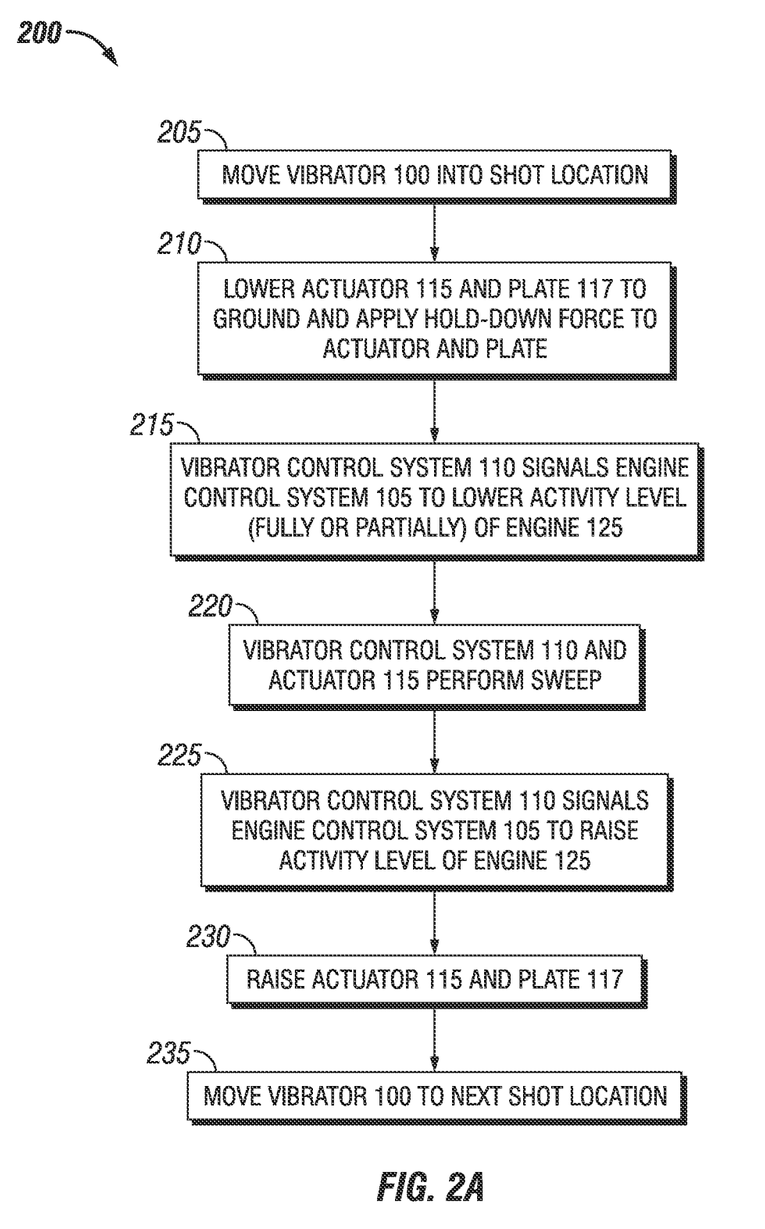
FIG. 2a includes a method for reducing noise in one embodiment of the invention.

FIG. 2a includes method 200 for reducing noise in one embodiment of the invention. In block 205 vibrator 100 is positioned or driven to a shot position using power from engine 125. Engine 125 may also be used to power hydraulic pumps that charge accumulators 120 to a desired pressure level (e.g., 3,150 pounds per square inch (PSI)). In block 210 hydraulic pressure from charged accumulators 120 may be used to lower actuator 115 and base plate 117 to the ground and force plate 117 against the ground with sufficient hold-down force. The pressure from accumulators 120 may be sufficient to manipulate actuator 115. However, pressure from pumps may also be sent to accumulator 115 via manifold 119. Thus, the pressure from accumulators 120 may be unnecessary or may be used to augment or replace pressure from pumps coupled to engine 125. In block 215 VCS 110 may communicate (e.g., automatically) to ECS 105 to lessen (fully or partially) the activity level for main engine 125. For example, VCS 110 may communicate to ECS 105 to turn engine 125 off. However, VCS 110 may instead communicate to ECS 105 to lower, but not altogether stop, activity level for main engine 125 by lowering the activity level (e.g., revolutions per minute or "RPM" level) of engine 125. For example, engine RPM level may be reduced from about 20,000 RPM to about 3,000 RPM or less. Other embodiments may reduced the RPM level to varying levels such as 15,000; 14,000; 13,000; 12,000; 11,000; 10,000; 9,000; 8,000; 7,000; 6,000; 5,000; 4,000; 2,000; or 1,000 RPM. In block 220 VCS 110 may trigger (e.g., automatically) actuator 115 to perform sweep generation after engine activity level and engine noise is decreased. The power required to perform the sweep may already be stored in the vibrator hydraulic system (e.g., accumulator 120), thereby negating or lowering the need for engine 125 to charge the hydraulic system to generate the needed pressure to operated actuator 115 during the sweep. Accumulator 120 may supply all power needed for the sweep based on charging performed before engine 125 activity level is lowered. However, in some embodiments accumulator 120 may be charged to some extent using power from engine 125, and its associated pump(s), via manifold 119 while engine 125 operates at a reduced activity level. In block 225, after the sweep(s) is/are complete and after any listening time(s) expire, VCS 110 may automatically communicate to ECS 105 to switch or cycle main engine 125 on (from an off state) or to an increase activity level (from a decreased activity level). In block 230 actuator 115 and plate 117 are raised and in block 235 vibrator 100 may be moved to the next shot position. Thus, vibrator 100 may conduct seismic sweeping based on pressure input to accumulator 120 and lowering engine noise from noise associated with, for example, blocks preceding block 215 to a lower noise level after block 215.

In an embodiment, at block 215 VCS 110 may also lessen the activity level of vehicle cooling system 135 and in block 225 VCS 110 may also elevate the activity level of system 135. For example, the activity level of a cooling system fan may be lowered completely or partially (e.g., from about 21,000 RPM to about 7,000 RPM). The activity level of other sources of noise may also be lowered and raised in a similar manner. In an embodiment, a number of cylinders used in engine 125 may be reduced during the low activity period. Those affected cylinders may have their respective activity levels lessened fully or partially.

Of note, equipment module boundaries described herein may not have strictly defined boundaries. For example, engine module 125 may include a plurality of distributed engines that perform a variety of tasks. Engine 125 may include an engine module to move vibrator 100 from one shot location to another and another engine module may be used to operate the hydraulic system and charge accumulators 120. In an embodiment, some of the engine modules of engine module 125 may be turned off (or have lowered activity) while other engines are not turned off, are maintained at pre-sweep intensity levels, or have reduced activity that may be reduced to a lesser extent than other engines. Various combinations or activity level lowering schemes are embodied herein.

In addition, other equipment module boundaries regarding, for example, hydraulic systems may not have strictly defined boundaries. In an embodiment a hydraulic system may include a hydraulic module to lower and raise actuator 115 and base plate 117 and another hydraulic module to operate actuator 115 and plate 117 during sweeps. Each module may be powered and charged by engine 125 or by separately operated modules of engine 125. As a result, in an embodiment during a sweep the engine module for charging the hydraulics for lowering actuator 115 and plate 117 may be turned off (or have its activity level lowered) while the module for charging the hydraulics to operate actuator 115 and plate 117 during the sweep operate at a heightened activity level.

Figure 2B:
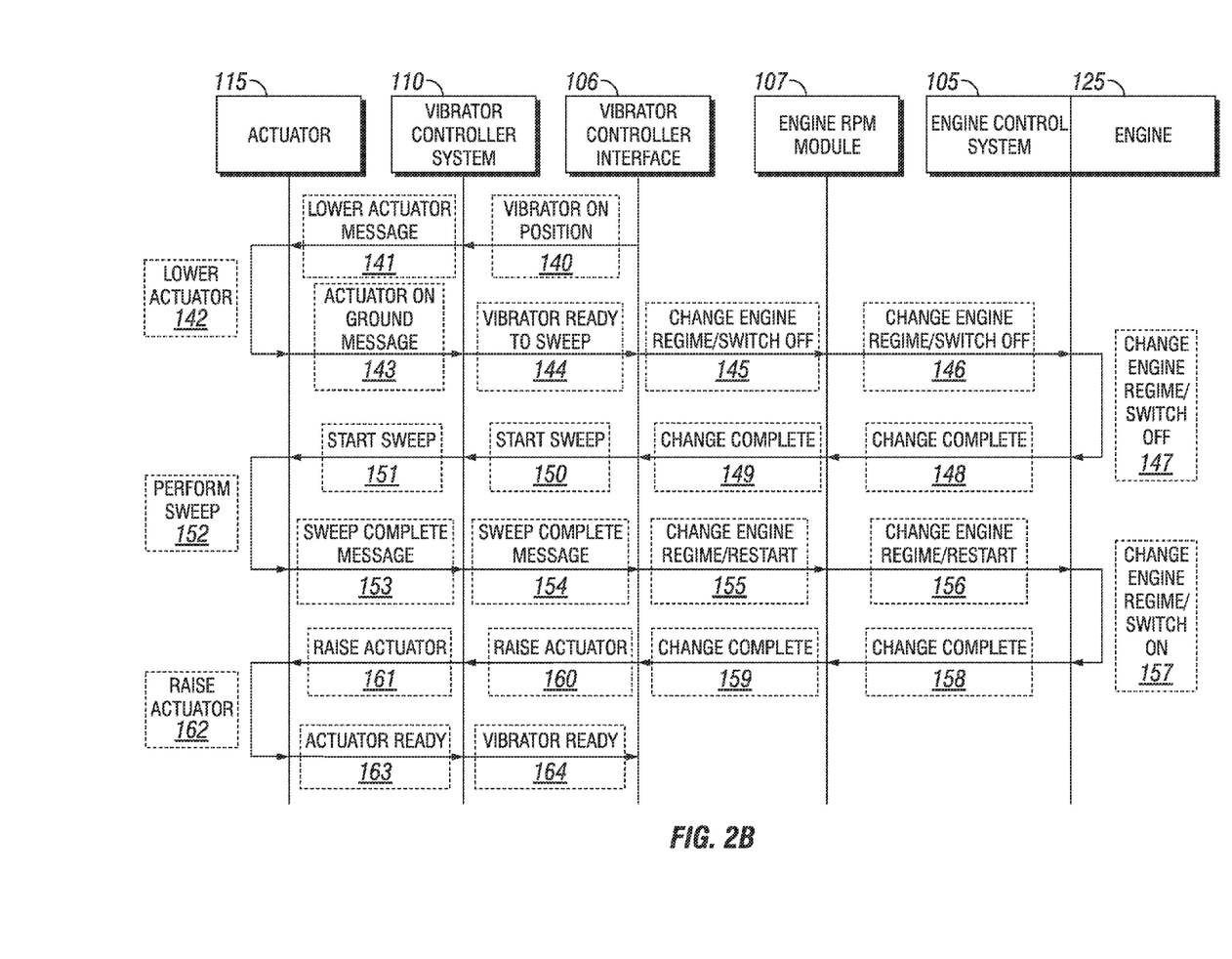
FIG. 2b includes a method for reducing noise in one embodiment of the invention.

FIG. 2b includes a method for reducing noise in one embodiment of the invention. VCS 110 may communicate with ECS 105 via, for example, vibrator controller interface module 106 and engine RPM module 107. More specifically, in block 140 interface 106 may communicate to VCS 110 that vibrator 100 is over the desired shot location. In block 141 VCS 110 may communicate to actuator 114 to lower actuator 115 and plate 117 to ground (which may be performed in block 142 resulting in a corresponding confirmation communication being sent to VCS 110 in block 143). In block 144 VCS 110 may communicate to interface 106 that a sweep may be performed. In block 145 interface 106 may communicate to module 107 to change engine 125 activity level (fully or partially). Module 107 communicates the message to ECS 105 in block 146, which results in lowering engine activity in block 147 along with corresponding completion communications being sent in blocks 148 and 149. In block 150 a communication to begin sweeping may be sent from interface 106 to actuator 115 in block 151 and sweeping may be performed in block 152. Corresponding completion communications are sent in blocks 153 and 154. In block 155 interface 106 communicates to module 107 to raise engine activity level. This communication may be sent in block 156 to ECS 105. In block 157 the adjustment may be performed and corresponding confirmation communications are sent in blocks 158 and 159. In block 160 a communication to raise actuator 115 and plate 117 may be sent to VCS 110 and a corresponding communication may be sent to actuator 115 in block 161. In block 162 actuator 115 and plate 117 are raised. In block 163 an "actuator ready" communication may be sent to VCS 110 which then, in block 164, sends a "vibrator ready" communication to interface 106.

As used herein, when a communication is sent from one module to another module such a communication may include the original communication itself as well as communications related to or derived therefrom. Also, interface 106 may be automated to varying degrees. For example, interface 106 may prompt a user at block 150 to begin a sweep or may instead automatically commence sweeping once a lowered engine activity level is indicated in block 149. Also, activity level for engine 125 may be automatically lowered once vibrator 100 becomes stationary (e.g., over a shot location). Furthermore, embodiments of the invention need not necessarily include every module of FIG. 2b. For example, some embodiments may not include module 107 or may combine the functionality of module 107 with another module such as ECS 105.

Figure 3:
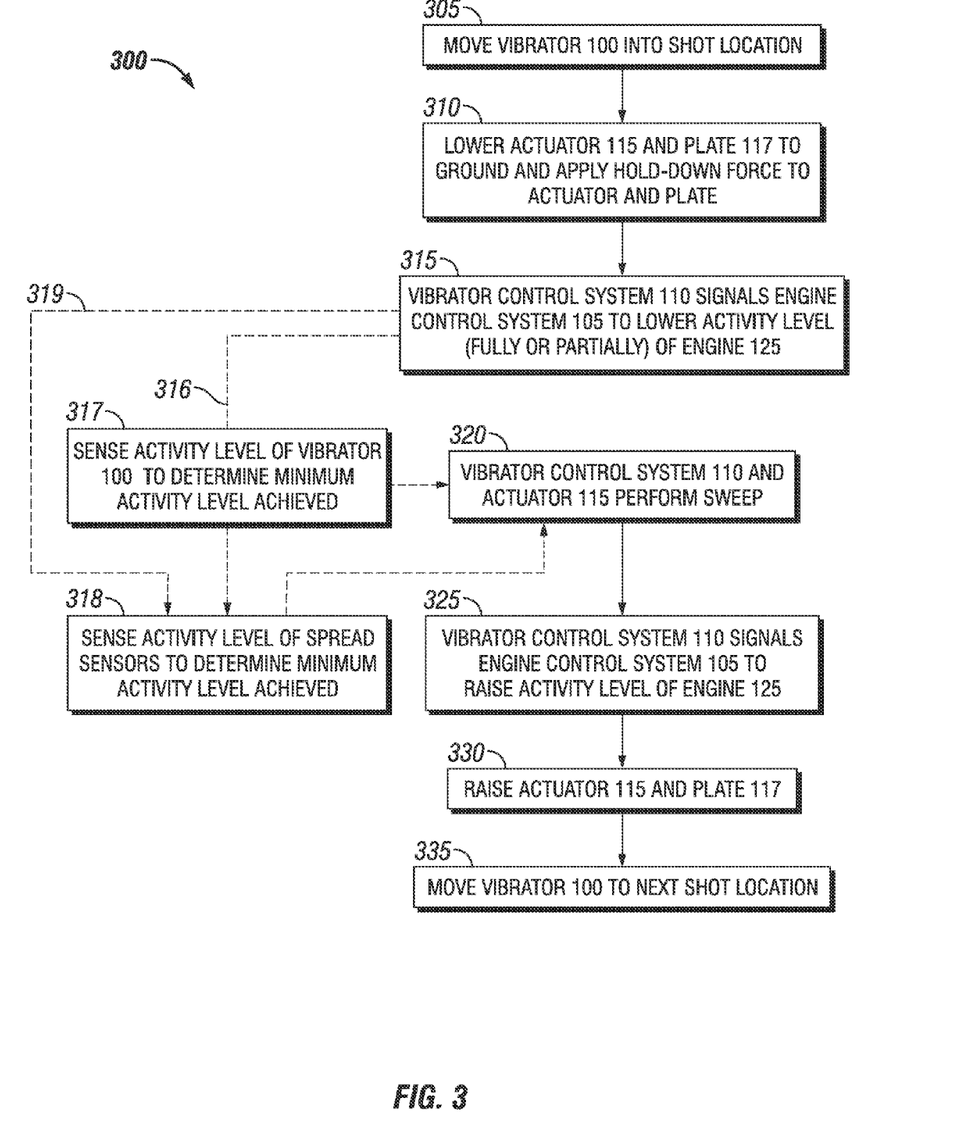
FIG. 3 includes a method for reducing noise in one embodiment of the invention.

FIG. 3 includes method 300 for reducing noise in one embodiment of the invention. In block 305 vibrator 100 may be positioned on a shot position and in block 310 actuator 115 and base plate 117 are lowered to the ground and accumulators 120 supply hold-down force to actuator 115 and plate 117. In block 315 VCS 110 automatically communicates to ECS 105 to lessen (fully or partially) the activity level for main engine 125 and, in some embodiments, other components (e.g., cooling system 135). In block 317 sensors 127 (e.g., single or multi-component accelerometers and/or pressure sensors) make activity measurements (e.g., vibration level, sound level, and the like) for vibrator 100. Sensors 127 may be located at different positions (e.g., on or functionally proximate to engine 125, cooling system 135, exhaust 130, and other sources of noise). VCS 110 may continuously or periodically sample activity levels sensed by sensors 127. After activity level is below a threshold (e.g., a predetermined threshold), in block 320 VCS 110 may trigger (e.g., automatically) actuator 115 to perform sweep generation. Activity sensing may continue from before the sweep, throughout the sweep (or sweeps), and through any listening period(s). In block 325, after the sweep is complete and after a listening time (if any) expires, VCS 110 may automatically communicate to ECS 105 to switch or cycle main engine 125 on or to a higher activity level. In block 330 actuator 115 and plate 117 are raised and in block 335 vibrator 100 may be moved to the next shot position. Thus, in an embodiment a method may include sensing environmental noise and sweeping based on determining the sensed noise is less than a predetermined threshold.

In an embodiment of the invention, method 300 includes block 318. In block 318 activity level measurement from seismic sensors in the spread are monitored. VCS 110 may continuously (or periodically) sample activity levels sensed by the seismic sensors. In block 320, after activity level (e.g., sensed from the spread and/or vibrator 100) is below a threshold, VCS 110 may trigger actuator 115 to perform sweep generation. Determining whether a sensed activity level is acceptable may be based on, for example, the location of the particular sensor in question in relation to vibrator 100. For example, the value of a spread sensor located closer to the shot point may be weighed more heavily than a more distantly located spread sensor. Such an embodiment may prevent contamination of seismic data by noise generated from other sources not strictly related to vibrator 100 (e.g., other vibrators in the area, passing vehicles, and the like). Dashed line 316 indicates block 318 may be performed in conjunction with block 317. Dashed line 319 indicates block 318 may be performed in an embodiment where block 317 is not performed.

In one embodiment of the invention, to determine whether activity level is indeed below a threshold, activity data (e.g., noise) from multiple sensors could be analyzed. For example, a weighted sum could be used allocating higher weights (e.g., using varying coefficients) to sensors closer to vibrator 100. When the root mean square (RMS) for the weighted sum falls below a threshold for a fixed time period, vibrator 100 may commence sweeping automatically. This automated decision making may result in better quality data acquisition as well as more time efficient surveying (e.g., less time spent determining whether conditions are appropriate for surveying).

In an embodiment of the invention, vibrator 100 may perform sweeps based on data from sensors included on or coupled to vibrator 100 and/or within or coupled to the spread. For example, if the noise measurements are deemed high (e.g., exceed a threshold based on signal-to-noise (SNR) ratio) then a longer sweep may be performed (e.g., sweep performed over a larger duration of time). As another example, if the sensed noise includes strong low frequency components then the sweep's lowest frequency (i.e., sweep parameter) may be adjusted (e.g., lowest sweep frequency is higher than sensed low frequency noise). Also, other characteristics of the sweep may be affected by noise measurements. For example, power spectral density (PSD) for the noise may be determined using sensors coupled to vibrator 100 or one or more spreads. A sweep (e.g., non-linear sweep) may be performed based on a function for the PSD that may yield data with a desired SNR. Thus, if low frequency noise is detected more time may be spent sweeping at lower frequencies. Also, if there is less high frequency noise possibly less time may be spent sweeping at higher frequencies. Furthermore, in one embodiment sweeps may be generated instantaneously based on noise detected. Also, a sweep may be automatically selected (based on noise) from, for example, a list of sweeps.

In an embodiment of the invention, sweeping may be delayed until after activity level is below a threshold. In such a case, the eventual sweep may be triggered from vibrator 100, a corresponding recording unit (e.g., recording truck), and the like. The relevant noise to be considered may come from vibrator sensors 127, sensors in one or more spreads (e.g., from the spread nearest vibrator 100), sensors coupled to other vibrators, sensors coupled to a recording truck or trucks, and combinations thereof. Also, triggering the sweep may occur based on commands from multiple sources. For example, vibrator 100 may communicate with a recording truck that noise sensed by vibrator 100 is acceptable. Afterwards, the recording truck may monitor noise in a spread nearby vibrator 100 until the noise level is acceptable. The recording truck may then communicate to vibrator 100 that spread noise is acceptable. Vibrator 100 may then trigger the sweep.

In an embodiment of the invention, the extent to which the activity level is lowered for engine 125 may be based on sensing the noise. For example, noise could be sensed from sensors on the vibrator and/or generally in the spread. Based on the level of noise sensed, the RPM level for engine 125 could be lowered. Thus, if a lower noise level is detected the RPM level may be slightly lowered. However, if a larger noise level is detected the RPM level may be reduced more dramatically. Thus, the activity level for engine 125 may not be lowered to an unnecessary level. As a result, before, during, or after a sweep engine 125 may supply power (e.g., complete or partial) to actuator 115 via manifold 119 and/or charge accumulator(s) 120.

Figure 4:
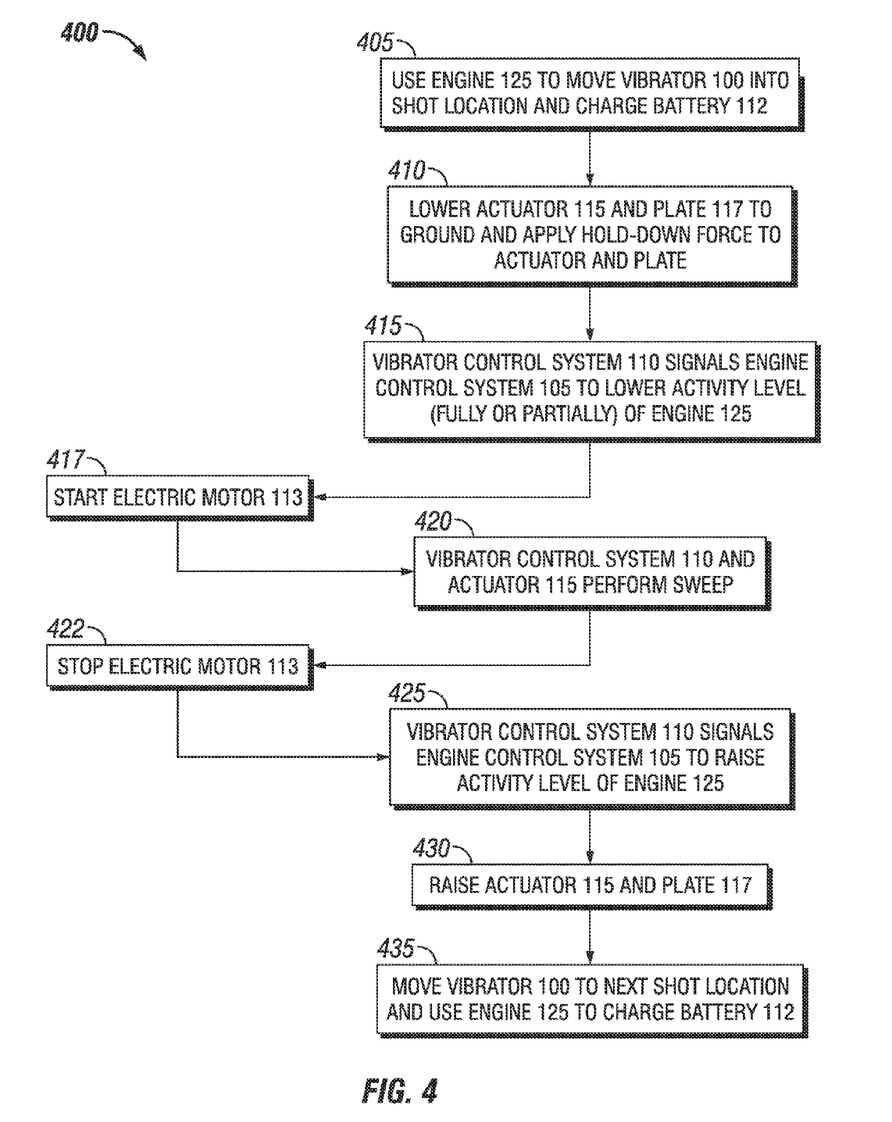
FIG. 4 includes a method for reducing noise in one embodiment of the invention.

FIG. 4 includes method 400 for reducing noise in one embodiment of the invention. In block 405 vibrator 100 uses engine 125 to travel and position itself on a shot position and, in one embodiment, charge battery or batteries 112 while en route to the shot position. In block 410 pressure may be sent via engine 125 and manifold 119 and/or accumulators 120 to supply complete or partial power to lower actuator 115 and base plate 117 to the ground and maintain sufficient holddown force to actuator 115 and plate 117. In block 415 VCS 110 automatically communicates to ECS 105 to lessen (fully or partially) the activity level for main engine 125. In block 417 VCS 110 starts (or increases activity level of) electric motor 113. The transition from powering accumulator 120 via electric motor 113 instead of engine 125 may be accomplished such that pressure in accumulators 120 may be maintained. In other words, accumulators 120 may be charged using various levels of cooperation between engine 125 and motor 113. In block 420 VCS 110 may automatically trigger actuator 115 to perform sweep generation using power from accumulators 120. To the extent accumulators 120 need to be recharged while engine 125 is in a lower activity level mode, the recharging may occur using electric motor 113 in varying levels of cooperation with engine 125. Accumulator 120 recharge may be needed before sweeping (e.g., to lower actuator 115 and plate 117 or to maintain hold down pressure on actuator 115 and plate 117), during sweeping (e.g., to supply pressure during a sweep or in between multiple sweeps), or after sweeping (e.g., to maintain hold down pressure on actuator 115 and plate 117 or to raise actuator 115 and plate 117) is performed. In an embodiment, the sweep may occur after various sensors (e.g., on vibrator 100, in the spread array, and the like) indicate noise or activity is at an acceptable level. In block 422 electric motor 113 may be turned off or its activity level may be lessened. In block 425, after the sweep(s) is/are complete and after a listening time (if any) expires, VCS 110 automatically communicates to ECS 105 to increase the activity level of engine 125. In block 430 actuator 115 and plate 117 are raised using power from accumulators 120 (in possible cooperation with pressure from engine 125 and pumps via manifold 119). The power to raise components 115, 117 may be present from charges performed by motor 113, by a recharge from engine 125, or a combination thereof. In block 235 vibrator 100 may be moved to the next shot position while charging battery 112.

In one embodiment, electric motor 113 may be operated in a continuous or predominantly continuous fashion. For example, electric motor may be on continuously while vibrator 100 is operating. As a result, accumulator 120 may be fully charged (e.g., 3,000 to 4,000 PSI) before vibrator 100 arrives at a shot location. Operating motor 113 may continuously help supply hydraulic pressure to actuator 115, which may promote overall vibrator efficiency. Continuous hydraulic pressure to actuator 115 may allow mass 118 to remain at 50% height of full travel on guide columns 114 when not sweeping (e.g., moving among different shot locations). Furthermore, continuous pressure may help stabilize mass 118 and thereby promote safety for vibrator 100. Also, continuous pressure may help avoid the need to reset mass 118 in between periods of pressure loss. Resetting mass 118 can be a relatively lengthy process that may decrease the number of sweeps that can occur in a given period of time. Also, constant pressure can be fed to cooling system 135 to cool various systems.

In an embodiment, once actuator 115 is lowered to the ground ECS 105 and VCS 110 may reduce the activity level for engine 125, followed by reducing activity level for electric motor 113 to maintain holdown pressure (e.g., 2,300 PSI). A listening period may then commence, followed by a sweep (utilizing stored energy in accumulator 120 and/or residual pressure from manifold 119 and engine 125). After a sweep and listening period are finished, ECS 105 and VCS 110 may then instruct electric motor 113 to maximum activity level to recharge accumulators 120 and lift actuator 115. Also, engine 125 may return to a high activity level and vibrator 100 may be driven to another location.

Figure 5:
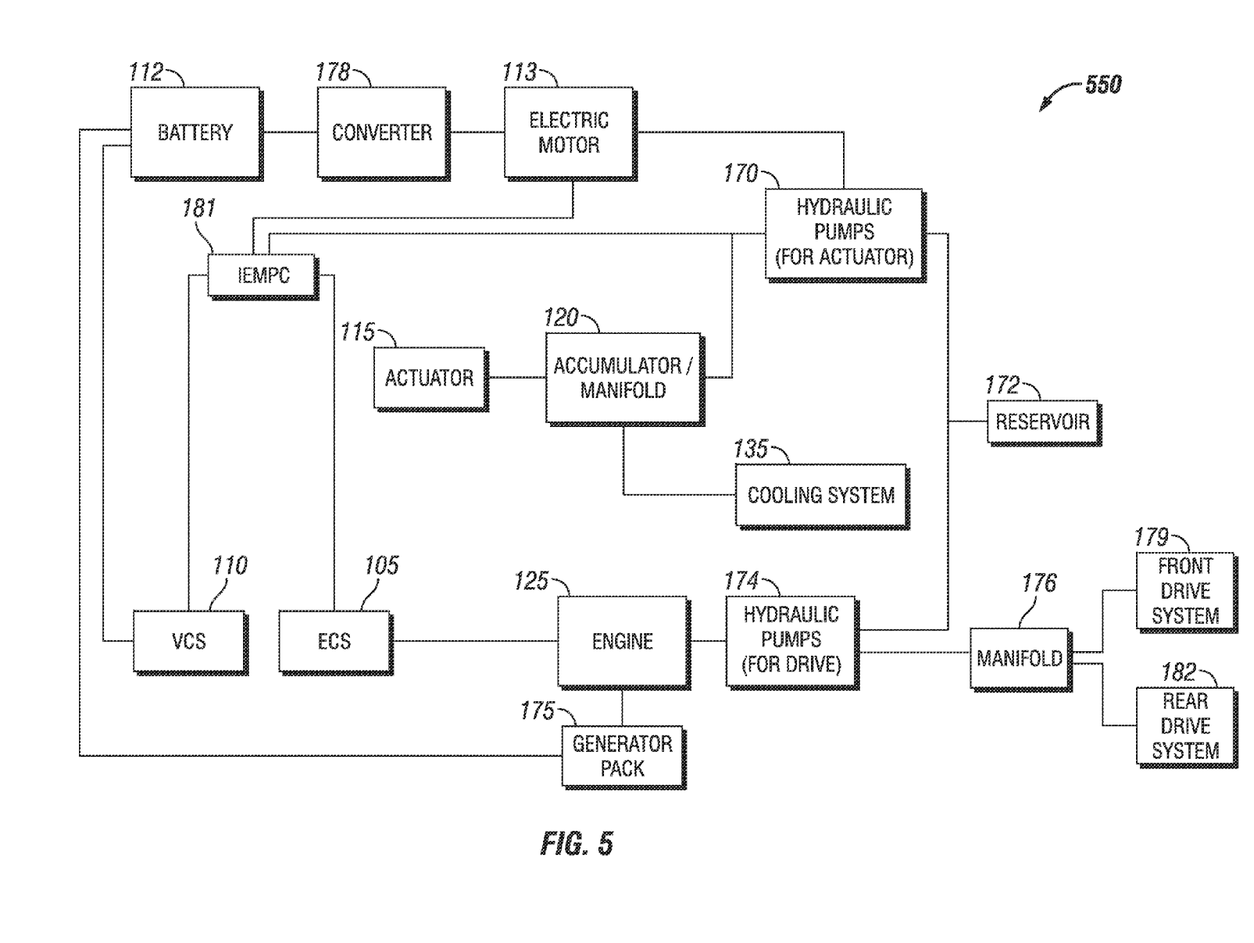
FIG. 5 includes a block diagram representative of a seismic vibrator noise reduction system in one embodiment of the invention.

FIG. 5 includes seismic vibrator noise reduction system 550 in one embodiment of the invention that may be used with embodiments described herein. Power from battery or batteries 112 may be converted with converter 178 and delivered to electric motor 113. Motor 113 may deliver power to hydraulic pump or pumps 170, which may access fluid from reservoir 172 to supply hydraulic pressure to accumulator/manifold 120. Accumulator/manifold 120 denotes a manifold and accumulator system. Thus, the manifold portion of accumulator/manifold system 120 may supply hydraulic pressure from pump 170 to operate actuator 115 (e.g., raise and lower actuator 115, operate actuator 115 during sweeps). Should the manifold portion be unable to supply the desired pressure, the accumulator portion of accumulator/manifold 120 may supply hydraulic pressure to actuator 115. For example, the accumulator portion may supply pressure when pressure from the manifold portion is depleted. Also, the accumulator portion may supply pressure to even out or regulate pressure demand spikes that cannot be evenly handled by the manifold portion alone.

Hydraulic fluid used by accumulator/manifold 120 may be cooled using cooling system 135. Pump 170 may be controlled by VCS 110 via an integrated engine, pump, motor controller module (IEMPC) 181. IEMPC 181 may communicate with ECS 105 to control engine 125. Engine 125 charges battery 112 via generator pack 175 and delivers power to hydraulic pump 174. Pump 174, which may access fluid from reservoir 172, may supply pressure to front drive system 179 and rear drive system 182 via manifold 176. Systems 179, 182 may be used to move vibrator 100 from one shot location to another shot location. Various components (e.g., VCS 110 and ECS module 105) may be battery powered. In one embodiment, IEMPC 181 includes the functionality of ECS 105 and VCS 110.

Thus, in one embodiment some pumps 174 may be used for a drive system to move vibrator 100 from location to location while other pumps 170 may be used to operate actuator 115. Consequently, pumps 174 may have lowered activity to lower noise while pumps 170 operate at a higher activity level to charge accumulator 120. Furthermore, one set of pumps 170 may be powered by electric motor 113 while other pumps 174 are powered by engine 125.

In an embodiment of the invention, IEMPC module 181 may be replaced or coupled to a high pressure control module (not shown) and engine RPM module (107 in FIG. 2B). A high pressure control module and engine RPM module may allow an operator a less automated method for controlling system 550. For example, high pressure control module and engine RPM module may allow an operator to verify certain conditions are present before allowing an action to take place.

In an embodiment, high pressure control module and engine RPM module may separately or collectively prompt the operator when engine 125 activity level falls below a threshold, at which time the operator may commence a sweep. However, IEMPC may automate this procedure and automatically commence the sweep once engine 125 activity level falls below a threshold.

Embodiments of the invention are not limited to supplying power to hydraulic systems using engine 125 or motor 113. Instead, at times engine 125 and motor 113 may be used simultaneously (e.g., during hand-off from engine 125 to motor 113, during hand-off from motor 113 to engine 125, or during times of stress that require input from both engine 125 and motor 113).

Thus, in an embodiment of the system sufficient pressure (e.g., 4,000 PSI) may be maintained (or adjusted as desired by an operator) in accumulators 125 even during periods when the activity level for engine module or modules 125 is lowered (e.g., during a sweep). Accordingly, built-up pressure in accumulators 125 may not be completely bled off during lower activity periods. As a result, accumulators 125 may maintain the pressure needed to raise plate 117 after sweeping is complete without having to delay surveying (e.g., moving to another shot position) while waiting for engine 125 to start and recharge accumulators 125 in order to raise actuator 115 and plate 117.

While lowering the activity level of engine 125 may help to obtain cleaner data, lowering the activity level without cycling engine 125 completely off may also extend the operation life of engine 125 and its associated components (e.g., starter motor, flywheel ring gear, and the like).

In an embodiment data recording may begin at various periods before sweeping commences. For example, data recording may begin before noise is deemed below an acceptable level. In such instances, recorded data regarding noise can be analyzed after some or all data acquisition exercises are complete to determine when acceptable noise levels were present and when proper sweep conditions existed. Such noise recordings may be later used to correlate noise and seismic data using conventional automated correlation, cross correlation, coherency techniques and the like.

Embodiments regarding general methods to eliminate or reduce noise herein are not limited to seismic testing on land with geophones but instead may also be used in marine environments with one or more sensors (e.g., hydrophones). Also, embodiments may be implemented with explosive surveys (e.g., dynamite), impulsive surveys, and the like. Furthermore, embodiments may function with non-hydraulic actuators such as electromagnetic actuators and the like. With electromagnetic actuators, magnets may be charged/operated by a combination of sources such as fossil fueled engines (e.g., engine 125) and battery powered engines or motors (e.g., motor 113) using "low activity" cycles as described herein to better manage noise and gather quality data.

In some embodiments the activities of several vibrators may be coordinated. Thus, multiple vibrators involved in simultaneous Vibroseis surveys may coordinate with one another so, for example, no sweeping from any vibrator occurs until each vibrator has determined activity levels (e.g., activity of vibrator engine, activity as sensed in one or more spreads, and the like) are below a desired level. Simultaneous surveys include those surveys where multiple sweeps are completed synchronously but may also include sweeps that overlap with one another to varying degrees.

Thus, in various embodiments higher quality seismic data may be obtained by eliminating or reducing noise produced from, for example, vibrator engines, cooling systems, exhaust units, general mechanical systems included or associated with the vibrator, nearby vibrators and traffic, and the like. The need for complex seismic data filtering schemes may be reduced. Embodiments may provide benefits beyond reduced complexity such as, for example, a lower likelihood that relevant seismic data will be incorrectly lost using a complex filtering scheme. Furthermore, the difficulty with attempting to filter non-coherent noise (e.g., noise affiliated with various vibrator components) may be avoided or lessened.

Figure 6:
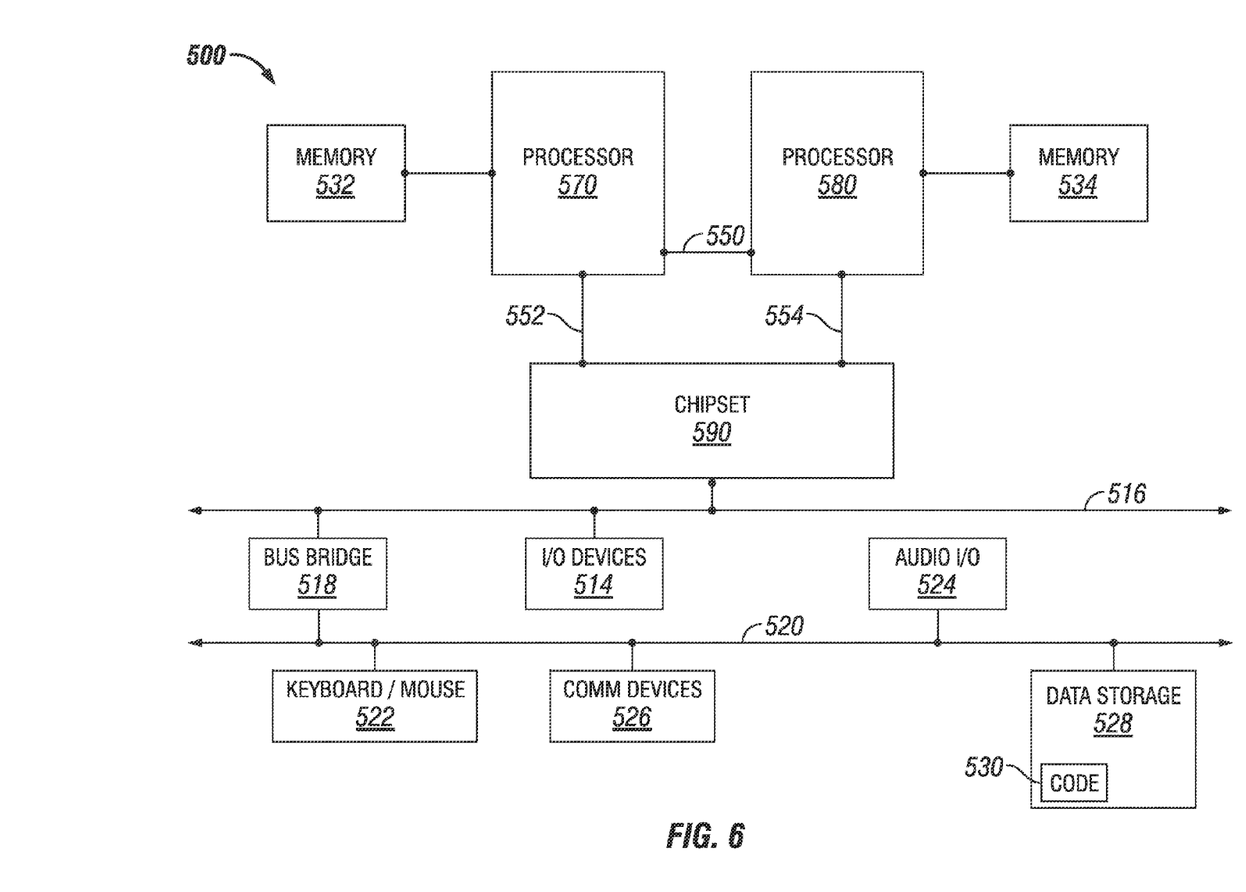
FIG. 6 includes a computer system in one embodiment of the invention.

Embodiments may be implemented in many different system types. Referring now to FIG. 6, shown is a block diagram of a system in accordance with an embodiment of the present invention. Multiprocessor system 500 is a point-to-point (P-P) interconnect system and includes first processor 570 and second processor 580 coupled via point-to-point interconnect 550. Each of processors 570 and 580 may be multi-core processors. The term "processor" may refer to any device or portion of a device that processes electronic data from registers and/or memory to transform that electronic data into other electronic data that may be stored in registers and/or memory. First processor 570 may include a memory controller hub (MCH) and P-P interfaces. Similarly, second processor 580 may include a MCH and P-P interfaces. The MCHs may couple the processors to respective memories, namely memory 532 and memory 534, which may be portions of main memory (e.g., dynamic random access memory (DRAM)) locally attached to the respective processors. First processor 570 and second processor 580 may be coupled to chipset 590 via P-P interconnects 552, 554 respectively. Furthermore, chipset 590 may be coupled to first bus 516 via an interface. Various input/output (I/O) devices 514 may be coupled to first bus 516, along with bus bridge 518, which couples first bus 516 to second bus 520. Various devices may be coupled to second bus 520 including, for example, keyboard/mouse 522, communication devices 526, and data storage unit 528 (e.g., disk drive or other mass storage device that includes code 530). Further, audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as DRAMs, static random access memories (SRAMs), erasable programmable read-only memories (EPROMs), flash memories, electrically erasable programmable read-only memories (EEPROMs), magnetic or optical cards, or any other type of media suitable for storing electronic instructions. Such computer-readable or computer-usable storage medium or media is (are) considered to be part of an article (or article of manufacture). An article or article of manufacture can refer to any manufactured single component or multiple components.

Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms. Thus, the terms "code" or "program" may be used to refer to any collection of instructions which, when executed by a processing system, performs a desired operation or operations. In addition, alternative embodiments may include processes (in code or otherwise) that use fewer than all of the disclosed operations, processes that use additional operations, processes that use the same operations in a different sequence, and processes in which the individual operations disclosed herein are combined, subdivided, or otherwise altered.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   operating a combustion engine, which is coupled to an accumulator of a seismic vibrator, at a first activity level corresponding to a first noise level;
   charging the accumulator with a first pressure input;
   lowering engine activity level of the engine to a second activity level corresponding to a second noise level that is lower than the first noise level; and
   seismic sweeping with the vibrator based on (a) the first pressure input, and (b) lowering engine noise from the first noise level to the second noise level.

2. The method of claim 1, wherein charging the accumulator includes operating an electric motor to charge the accumulator with the first pressure input.

3. The method of claim 1, wherein charging the accumulator includes operating an electric motor to charge the accumulator with the first pressure input while the engine has an activity level less than the first activity level.

4. The method of claim 3, wherein operating the electric motor to charge the accumulator includes operating the electric motor to charge the accumulator while the engine is not operating.

5. The method of claim 1 including raising an actuator from the earth based on charging the accumulator with an electric motor while the engine has an activity level less than the first activity level; wherein the vibrator is coupled to the actuator.

6. The method of claim 1, wherein sweeping with the vibrator includes sweeping while the engine is not operating.

7. The method of claim 1 including sensing a first environmental noise with a first sensor; wherein sweeping with the vibrator includes sweeping based on determining the first environmental noise is less than a first predetermined threshold.

8. The method of claim 7 including sensing a second environmental noise with a second sensor located generally in a seismic sensor spread; wherein (a) sweeping with the vibrator includes sweeping based on determining the second environmental noise is less than a second predetermined threshold; and (b) the first and second environmental noises are both non-coherent and the first sensor is coupled to the vibrator.

9. The method of claim 7, wherein sweeping with the vibrator includes sweeping for a first duration of time automatically determined based on sensing the first environmental noise.

10. The method of claim 7 including automatically selecting a sweep parameter based on sensing the first environmental noise; wherein sweeping with the vibrator includes sweeping based on the selected sweep parameter and not independently of the engine noise.

11. The method of claim 7, wherein (a) the second activity level is lower than the first activity level by a first difference, and (b) the magnitude of the first difference is based on sensing the first environmental noise.

12. The method of claim 7, wherein sweeping with the vibrator includes automatically initiating sweeping with no corresponding human operator intervention occurring between sensing the first environmental noise and initiating sweeping.

13. The method of claim 1 including sensing the second noise level with a first sensor; wherein sweeping with the vibrator includes sweeping based on determining the second noise level is less than a first predetermined threshold.

14. The method of claim 1 including:
   sensing a first environmental noise with a first sensor located generally in a seismic sensor spread; and
   determining the first sensor is within an acceptable proximity to the vibrator;
   wherein sweeping with the vibrator includes sweeping based on determining the first sensor is within the acceptable proximity to the vibrator.

15. The method of claim 1 including sensing a first environmental noise with a first sensor coupled to an additional seismic vibrator; wherein sweeping with the vibrator includes initiating sweeping based on determining the first environmental noise is less than a first predetermined threshold.

16. An article comprising a medium storing instructions that enable a processor-based system to:
   operate a combustion engine at a first revolution per minute (RPM) activity level corresponding to a first noise level; the engine coupled to a seismic vibrator having an actuator;
   lower engine activity level to a second RPM activity level corresponding to a second noise level that is lower than the first noise level; and
   sweep with the actuator based on the second noise level.

17. The article of claim 16 including instructions that enable the system to:
   operate an electric motor to charge an accumulator, coupled to the vibrator, with a first pressure input while operating the engine at an activity level lower than the first activity level; and
   sweep with the actuator based on the first pressure input.

18. The article of claim 16 including instructions that enable the system to:
   sense a first environmental noise with a first sensor; and
   sweep based on determining the first environmental noise is less than a first threshold.

19. The article of claim 18 including instructions that enable the system to sweep with the actuator based on lowering an activity level for a cooling system that is coupled to the engine.

20. The article of claim 16 including instructions that enable the system to:
   sense the second noise level with a first sensor; and
   sweep based on determining the second noise level is less than a first threshold.

21. A method comprising:
   operating a combustion engine, which is coupled to a seismic vibrator, while the engine has a first activity level corresponding to a first noise level;
   sensing a first environmental noise with a first sensor; and
   initiating seismic sweeping with the vibrator based on determining the first environmental noise is less than a first predetermined threshold.

22. The method of claim 21 including sensing a second environmental noise with a second sensor located generally in a seismic sensor spread; wherein (a) sweeping with the vibrator includes sweeping based on determining the second environmental noise is less than a second predetermined threshold; and (b) the first sensor is coupled to the vibrator.

23. The method of claim 21 including:
charging an accumulator, coupled to the vibrator, with a first pressure input; and
sweeping with the vibrator based on (a) the first pressure input, and (b) lowering engine activity level to a second activity level that produces a second noise level that is lower than the first noise level.

24. The method of claim 23, wherein charging the accumulator includes operating an electric motor to charge the accumulator with the first pressure input while the engine has an activity level less than the first activity level.

* * * * *